(12) United States Patent
Sawchuk et al.

(10) Patent No.: US 9,453,520 B2
(45) Date of Patent: Sep. 27, 2016

(54) HEATED FLOW CONDITIONING SYSTEMS AND METHODS OF USING SAME

(71) Applicant: Canada Pipeline Accessories, Co. Ltd., Calgary (CA)

(72) Inventors: Daniel A. Sawchuk, Chestermere (CA); Reginald Selirio, Calgary (CA)

(73) Assignee: Canada Pipeline Accessories, Co. Ltd., Calgary, Alberta (CA)

( * ) Notice: Subject to any disclaimer, the term of this patent is extended or adjusted under 35 U.S.C. 154(b) by 0 days.

(21) Appl. No.: 14/825,208

(22) Filed: Aug. 13, 2015

(65) Prior Publication Data

US 2016/0061372 A1 Mar. 3, 2016

Related U.S. Application Data

(60) Provisional application No. 62/044,485, filed on Sep. 2, 2014.

(51) Int. Cl.
*G01F 1/42* (2006.01)
*F15D 1/00* (2006.01)
*F16L 23/00* (2006.01)
*F16L 55/027* (2006.01)

(52) U.S. Cl.
CPC ............ *F15D 1/0005* (2013.01); *F16L 23/003* (2013.01); *F16L 55/02718* (2013.01)

(58) Field of Classification Search
CPC ... F16L 55/02709; F15D 1/025; F16K 47/08
USPC ............ 138/44, 42; 239/461, 590.3; 251/118
See application file for complete search history.

(56) References Cited

U.S. PATENT DOCUMENTS

| | | | | |
|---|---|---|---|---|
| 3,665,965 A | * | 5/1972 | Baumann | F16L 55/04 138/42 |
| 4,110,603 A | * | 8/1978 | Peterson | E03B 7/14 119/73 |
| 5,090,241 A | | 2/1992 | Kobayashi | |
| 5,255,716 A | * | 10/1993 | Wilcox | F15D 1/02 138/39 |
| 5,341,848 A | | 8/1994 | Laws | |
| 5,400,828 A | | 3/1995 | Ziu et al. | |
| 5,495,872 A | | 3/1996 | Gallagher et al. | |
| 5,529,093 A | * | 6/1996 | Gallagher | F15D 1/025 138/40 |
| 5,606,297 A | | 2/1997 | Phillips | |
| 5,762,107 A | | 6/1998 | Laws | |
| 5,959,216 A | | 9/1999 | Hocquet et al. | |

(Continued)

FOREIGN PATENT DOCUMENTS

| | | |
|---|---|---|
| CA | 2171828 | 3/1995 |
| CA | 2228928 | 8/1995 |

(Continued)

OTHER PUBLICATIONS

English Abstract of CN 102927091.

*Primary Examiner* — Patrick F Brinson
(74) *Attorney, Agent, or Firm* — Cahn & Samuels, LLP

(57) ABSTRACT

A heated flow conditioning system includes a flow conditioner comprising a plurality of apertures and a flange, the flange surrounding said plurality of holes and comprising a first open-ended groove; and a spacer ring comprising a second open-ended groove. The first and the second open-ended grooves are configured to be connectable to each other, thereby forming a fluid channel for at least one heating medium.

20 Claims, 8 Drawing Sheets

(56) References Cited

U.S. PATENT DOCUMENTS

| | | |
|---|---|---|
| 6,029,912 A | 2/2000 | Woolley |
| 6,145,544 A * | 11/2000 | Dutertre ............ F16L 55/02718 138/39 |
| 6,807,986 B2 | 10/2004 | Boger |
| 6,880,579 B2 * | 4/2005 | Boger .................... F16K 47/08 138/44 |
| 7,073,534 B2 | 7/2006 | Sawchuk et al. |
| 7,089,963 B2 | 8/2006 | Meheen |
| 7,464,611 B2 | 12/2008 | Matter et al. |
| 7,845,688 B2 | 12/2010 | Gallagher et al. |
| 7,958,910 B2 * | 6/2011 | Nakamori ............ B67C 3/2608 138/37 |
| 8,132,961 B1 | 3/2012 | England et al. |
| D697,581 S | 1/2014 | Sawchuk et al. |
| D701,939 S | 4/2014 | Sawchuk et al. |
| D721,417 S | 1/2015 | Sawchuk et al. |
| 2004/0055816 A1 | 3/2004 | Gallagher et al. |
| 2005/0178455 A1 | 8/2005 | Cancade et al. |
| 2008/0246277 A1 | 10/2008 | Gallagher et al. |
| 2008/0277009 A1 | 11/2008 | Sprague |
| 2011/0174407 A1 | 7/2011 | Lundberg et al. |
| 2011/0174408 A1 | 7/2011 | Lundberg et al. |
| 2012/0247223 A1 | 10/2012 | Sawchuk et al. |
| 2014/0196535 A1 | 7/2014 | Sawchuk et al. |

FOREIGN PATENT DOCUMENTS

| | | |
|---|---|---|
| CA | 2787659 | 7/2011 |
| CN | 102927091 A | 2/2013 |
| GB | 1469648 | 4/1977 |
| GB | 1601667 A | 11/1981 |
| WO | 2014040191 A1 | 3/2014 |
| WO | 2014110673 A1 | 7/2014 |
| WO | 2014186883 A1 | 11/2014 |

* cited by examiner

HEATED FLOW CONDITIONING SYSTEMS AND METHODS OF USING SAME

The present application claims priority to U.S. provisional application Ser. No. 62/044,485 filed on 2 Sep. 2014, the entirety of which is incorporated herein by reference.

FIELD OF THE INVENTION

The present invention relates to fluid flow conditioning systems. More particularly, the present invention relates to heated flow conditioning systems capable of reducing the buildup of solids and related methods.

BACKGROUND OF THE INVENTION

Pipelines are used to transport fluids in various industries, including chemical, oil and gas, and manufacturing industries. These industries use processes that require accurate measurements of fluid flow rates. Measurements can be taken at locations such as a meter station.

Meters that are used to measure fluid flow rates can function in several different ways. For example, meters can use any one of the following to measure fluid flow rates: (1) differential pressure of the fluid across an obstruction, (2) ultrasonic signal travel times, (3) turbine blade rotational speed, (4) Coriolis forces, and/or (5) electrical and magnetic fields being generated due to bulk fluid movement. Moreover, almost all measurement methods require the use of a fluid velocity distribution or velocity flow profile.

To achieve accurate fluid measurements, the flow profile of a fluid entering a metering device must be generally stable, non-rotating, and symmetric. Ongoing analysis and constant monitoring of thermal, hydraulic, and production chemistry issues during the flow of fluids through pipelines may be necessary to achieve performance goals.

One aspect of such analysis and monitoring involves minimizing flow disturbances, optimizing recovery, and enhancing overall production over the usable life of a system, a production field, a plant, and/or a pipeline, and the like. As such, one issue involves the management of solid depositions including, but not limited to, wax formation, hydrate formation, or asphaltene deposition during operations, planned and/or emergency shutdowns, and prior to startups after any prolonged shutdown.

In particular, solids deposition may be an issue in climates, such as in northern Europe, northern North America, or at high altitudes, where the fluid in pipelines is colder than in more southern climates.

With regard to hydrate formation, when water is in the presence of a gas at certain pressures and temperatures, bonding can take place between molecules of water and molecules of light hydrocarbon gas such as methane, ethane, and propane. As a result of this bonding, particles known as hydrates form and accumulate at various points along a flow path. Hydrate formation and accumulation can potentially block the passage of fluids altogether and detrimentally affect system performance.

Moreover, although flow conditioners can be generally used to correct the flow profile of the fluid such that it forms a fully-developed flow profile, flow conditioners are generally incapable of minimizing or preventing adverse solid buildup or deposition. Therefore, it would be useful and beneficial to have flow conditioners capable of minimizing or preventing solid depositions.

SUMMARY OF THE INVENTION

The invention provides in an embodiment a heated flow conditioning system including a flow conditioner comprising a plurality of apertures and a flange, the flange surrounding the plurality of holes and comprising a first open-ended groove; and a spacer ring comprising a second open-ended groove. The first and the second open-ended grooves are configured to be connectable to each other, thereby forming a fluid channel for at least one heating medium.

The invention provides in a further embodiment to any of the previous embodiments a heated flow conditioning system wherein the first open-ended groove is in flow communication with an inlet opening and an outlet opening of the flow conditioner for the at least one heating medium.

The invention provides in a further embodiment to any of the previous embodiments a heated flow conditioning system wherein the second open-ended groove is in flow communication with an inlet opening and an outlet opening of the spacer ring for the at least one heating medium.

The invention provides in a further embodiment to any of the previous embodiments a heated flow conditioning system wherein the flange and the spacer ring each comprise a plurality of grooves.

The invention provides in a further embodiment to any of the previous embodiments a heated flow conditioning system wherein the flange and the spacer ring each comprise an inner groove and an outer groove, the first and second open-ended grooves being between respective inner and outer grooves.

The invention provides in a further embodiment a pipe assembly including a fluid flow pipe and a heated flow conditioning system further to any of the previous embodiments in an orientation substantially perpendicular to an axis of fluid flow in the pipe.

The invention provides in a further embodiment a fluid flow system including a fluid flow pipe; a heated flow conditioning system further to any of the previous embodiments in an orientation substantially perpendicular to an axis of fluid flow in the pipe; and a device downstream of the heated flow conditioning system.

The invention provides in a method embodiment a method for preventing a formation of solid deposits in a flow conditioning system including providing a heated flow conditioning system further to any previous embodiment; inputting at least one heating medium into the fluid channel at a temperature above a minimum solid formation temperature to prevent solid buildup; circulating the at least one heating medium through the fluid channel; and outputting the at least one heating medium from the fluid channel.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

DETAILED DESCRIPTION OF THE INVENTION

Flow conditioners are generally designed to create a swirl-free or a fully-developed flow profile at a certain flow position, for example, at a metering device or station.

Several types of flow conditioners exist including, but not limited to, straightening vanes, tube bundles, and perforated plates. A perforated plate flow conditioner may include a perforated plate that is arranged within a pipe orthogonal to the fluid flow (i.e., across a cross section of pipe). The perforations or holes in the flow conditioner cause the fluid flow to be redistributed such that it forms a fully-developed flow profile.

Fluid flow measurement systems comprising such flow conditioners have been found to exhibit appreciable degradation in system accuracy over time. This degradation in system accuracy may be the result of the buildup of solid deposits on any at least one of a flow conditioner, a pipe, a meter, other system components, or any combination thereof.

Deposits on the system components can alter the geometry of the components, thereby detrimentally affecting the flow profile and resulting in meter error and sometimes system failure. Deposits may include, but are not limited to, wax, hydrates (e.g., hydrates of hydrocarbons), or other solid or partially-solid formations.

Figure 1A:
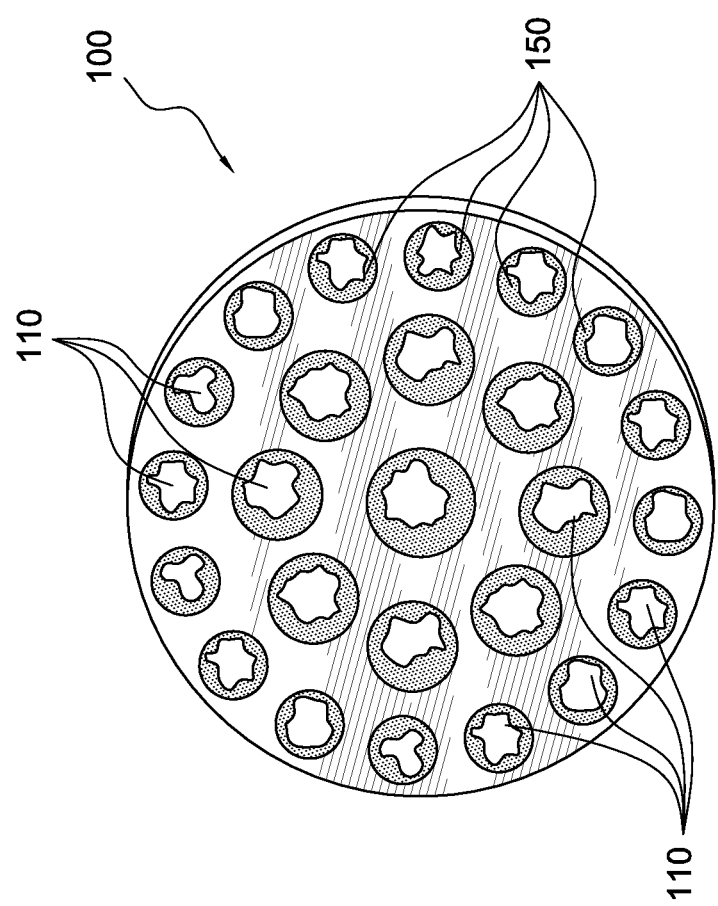
FIG. 1A illustrates a prior art flow conditioner after a period of use.
Figure 1B:
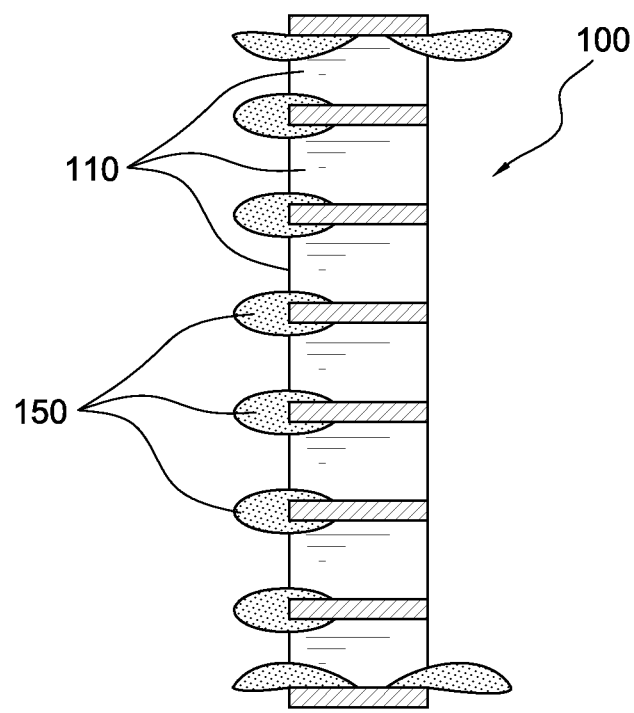
FIG. 1B illustrates a side view of a prior art flow conditioner.

FIGS. 1A-1B illustrate a flow conditioner 100 after a period of use in a flow measurement system. With reference to FIG. 1A, the flow conditioner 100 includes a plurality of apertures or holes 110. Over time and/or through the normal use and operation of the flow measurement system, a buildup of solids or deposits 150 may accumulate, for example, around a perimeter of the apertures or holes 110. The location of the buildup of solids 150 is not particularly limited and may be at other locations. In some instances, the buildup of solids 150 may increase to a level that blocks or prevents fluid from flowing through the apertures or holes 110. FIG. 1B illustrates a side view of flow conditioner 100.

Figure 1C:
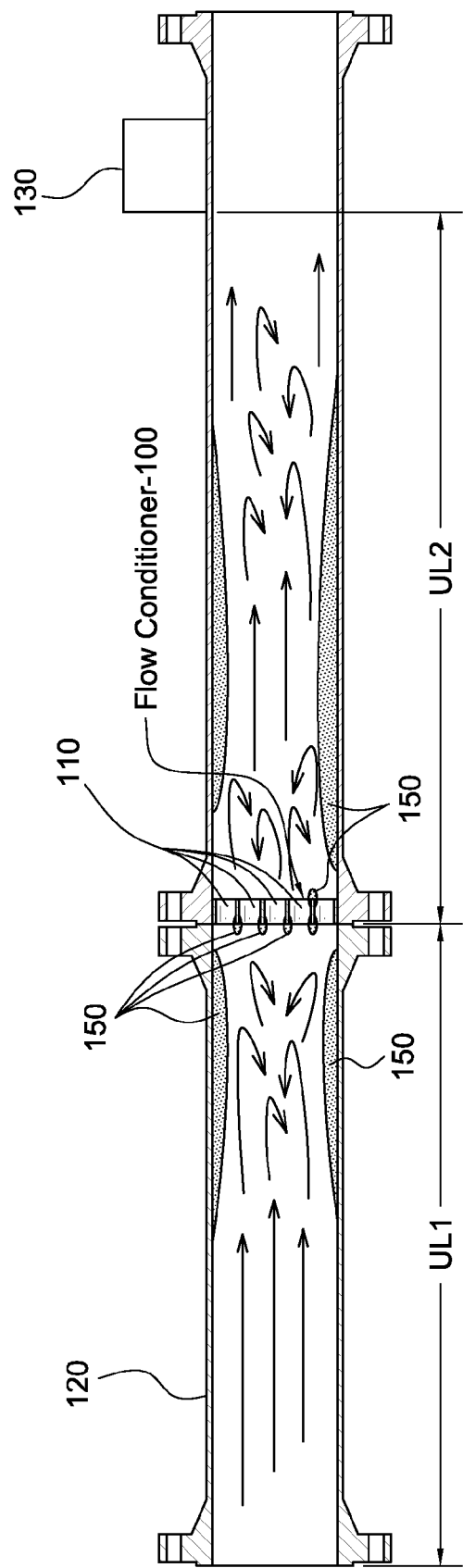
FIG. 1C illustrates an example of a flow measurement system that includes a prior art flow conditioner.

FIG. 1C illustrates a flow measurement system that includes flow conditioner 100 after a period of use. The flow measurement system includes a plurality of components present along a meter run including the flow conditioner 100 having a plurality of apertures 110; a section of pipe 120; and a fluid flow measurement device 130. Pipe section 120 may be divided into two length sections. Length UL1 defines a length of pipe 120 disposed immediately upstream of flow conditioner 100, measured from one face of the flow conditioner 100. Length UL2 defines a length of pipe 120 measured from the opposite face of the flow conditioner 100 to the fluid flow measurement device or meter 130.

As shown in FIG. 1C, over time, a buildup of solids 150 within the fluid flow collects on various fluid flow measurement system components, such as on surface areas and perimeters of the flow conditioner 100 and pipe the 120. The buildup of solids 150 can also create turbulence in the fluid flow, block the flow of fluid altogether, and/or create detrimental changes in the flow cross sectional area that can cause the fluid flow measurement device 130 to make inaccurate measurements.

According to the present invention, heated flow conditioning systems improve performance in flow conditioning systems by minimizing or preventing solid buildup or deposits on surfaces of the flow conditioner and other system components. The present invention further allows for less spacing between pipe equipment and more freedom in meter station layout.

Figure 2B:
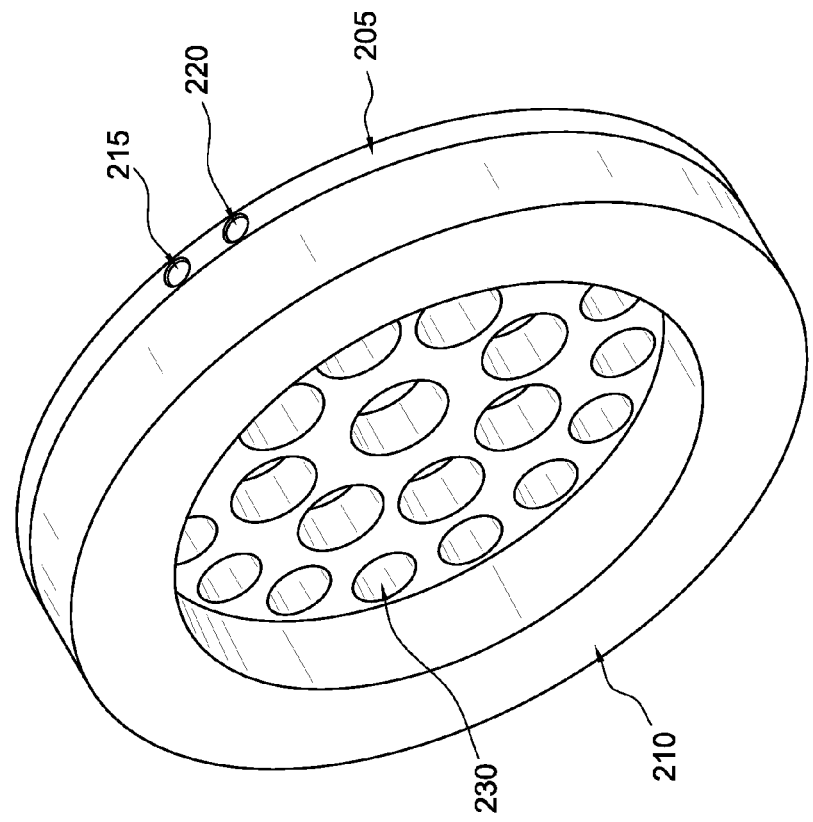
FIG. 2B illustrates an assembled heated flow conditioning system having an inlet opening and outlet opening in a flow conditioner according to one embodiment of the present invention.
Figure 2A:
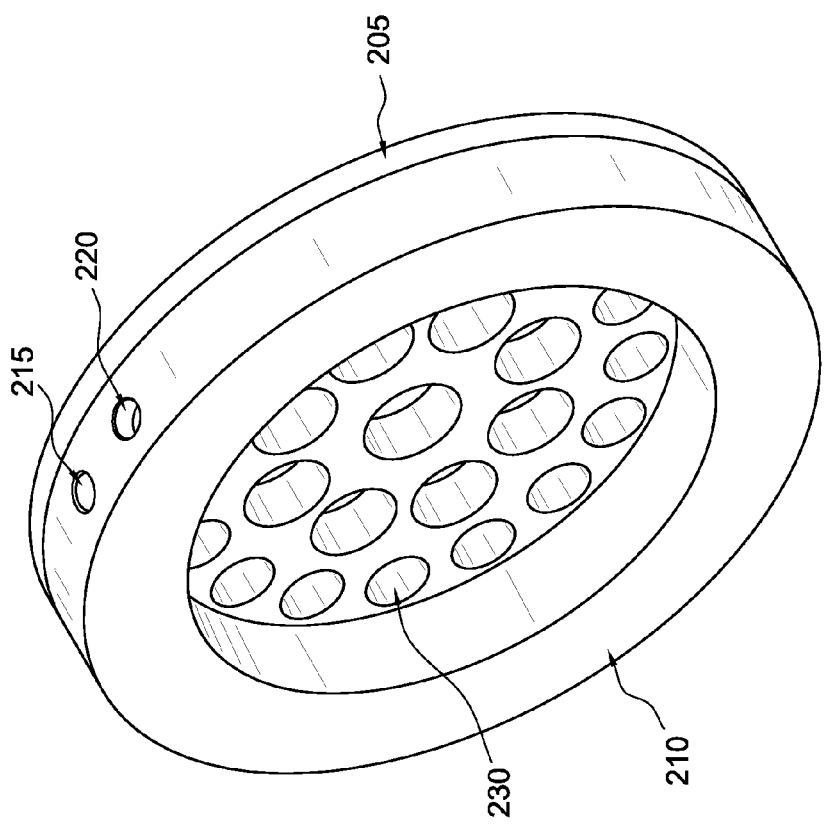
FIG. 2A illustrates an assembled heated flow conditioning system having an inlet opening and outlet opening in a spacer ring according to one embodiment of the present invention.

FIGS. 2A-2B illustrate an assembled heated flow conditioning system according to the present invention. The heated flow conditioning system includes a flow conditioner 205 and a spacer ring 210. The flow conditioner and the spacer ring may be attached via a clamping mechanism, bolts, screws, threaded ends, welding, adhesives, and the like.

The flow conditioner 205 may include a plurality of apertures or holes 230 positioned across its surface area. The size, location, and arrangement of the plurality of apertures or holes 230 is not particularly limited and may be in various configurations. The flow conditioner 205 may include a flange portion that surrounds a circumference, and particularly an outer perimeter, of a portion of the flow conditioner comprising the apertures or holes. Configurations for the flow conditioner of the present invention may include, but are not limited to, CPA TBR®, TBRL®, 50E®, 55E®, 60E® and 65E® flow conditioners available from Canada Pipeline Accessories, Inc. of Calgary, Canada.

The spacer ring 210 may comprises a ring having a central open space substantially corresponding in size to the flow conditioner surface area comprising apertures or holes 230, as illustrated in FIGS. 2A-2B.

As shown in FIG. 2A, the spacer ring 210 may include at least two openings 215, 220. One opening comprises an inlet opening and the other opening comprises an outlet opening. Thus, openings 215, 220 may be configured to allow for the input and output of at least one heating medium into and out of the heated flow conditioning system. In another specific embodiment shown in FIG. 2B, the flow conditioner 205 may include an inlet opening and outlet openings 215, 220, rather than such openings being located in the spacer ring 210.

According to the present invention, a flow conditioner and a spacer ring may each include a mating surface that allows the flow conditioner and spacer ring to be joined or attached together. The mating surfaces may be configured to be releasably or removably attachable to each other. Alternatively, the mating surfaces can be configured to be fixably, or permanently, attached to each other. In embodiments, the mating surface of the flow conditioner may be provided in the flange portion.

In specific embodiments, the flow conditioner and the spacer ring (e.g., the respective mating surfaces) may each comprise at least one open-ended groove, that is, a groove having a first end and a second end that are not connected to each other. According to the present invention, the at least one open-ended groove is in flow communication with an inlet opening and an outlet opening for at least one heating medium. For example, one end of the at least one open-ended groove may be in flow communication with an inlet opening of the spacer ring and/or flow conditioner and an opposing end of the open-ended groove may be in flow communication with an outlet opening of the spacer ring and/or flow conditioner.

The mating surfaces may each comprise a plurality of grooves. For example, the mating surfaces can include an inner groove, an outer groove, and at least one groove positioned between the inner and outer grooves (see FIGS. 3-5). In embodiments, the inner and outer grooves may each comprise closed grooves having a circular or any desire shape. The at least one groove positioned between the inner and outer grooves may be an open-ended groove of a substantially circular or any desired shape. The inner and outer grooves may be configured to receive a sealing gasket, such as an O-ring.

In specific embodiments, a first mating surface (e.g., of the flow conditioner) and a second mating surface (e.g., of the spacer ring) may each have an open-ended groove that are mirror images of each other. As such, an open-ended groove of a first mating surface and an open-ended groove of a second mating surface may be lined up and connected to each other, thereby forming a fluid channel for circulating at least one heating medium within the system via the inlet and outlet openings.

According to the present invention, the at least one heating medium may be input at a temperature above a minimum solid formation temperature to prevent the formation of solids at various points or locations in the system. The minimum solid formation temperature is a function of at least one of the solid buildup or deposit composition; fluid pressure; geometry of pipe; or the presence of additional liquids, fluids and/or gases. With regard to hydrate deposits, the at least one heating medium may be input at a temperature above at least 70° C. In specific embodiments, the at least one heating medium may be input at a temperature ranging from approximately 200° C. to 300° C.

Suitable heating mediums include, but are not limited to, liquids, gases, fluids, and mixtures thereof. For example, aqueous glycol, water, steam, an oil, or combinations thereof may be used as heating mediums.

In embodiments, the inlet openings of the spacer ring and/or flow conditioner may be configured to allow for the input to or connection to a heating source. The heating source may include any power source configured to heat the heating medium and/or the system to a specific temperature.

Various features and characteristics of the heated flow conditioning system of FIGS. 3-6 share features which substantially correspond to, and/or are identical with, those described above with regard to FIGS. 2A-2B. Accordingly, the above description with regard to FIGS. 2A-2B may apply and may not be repeated.

Figure 3:
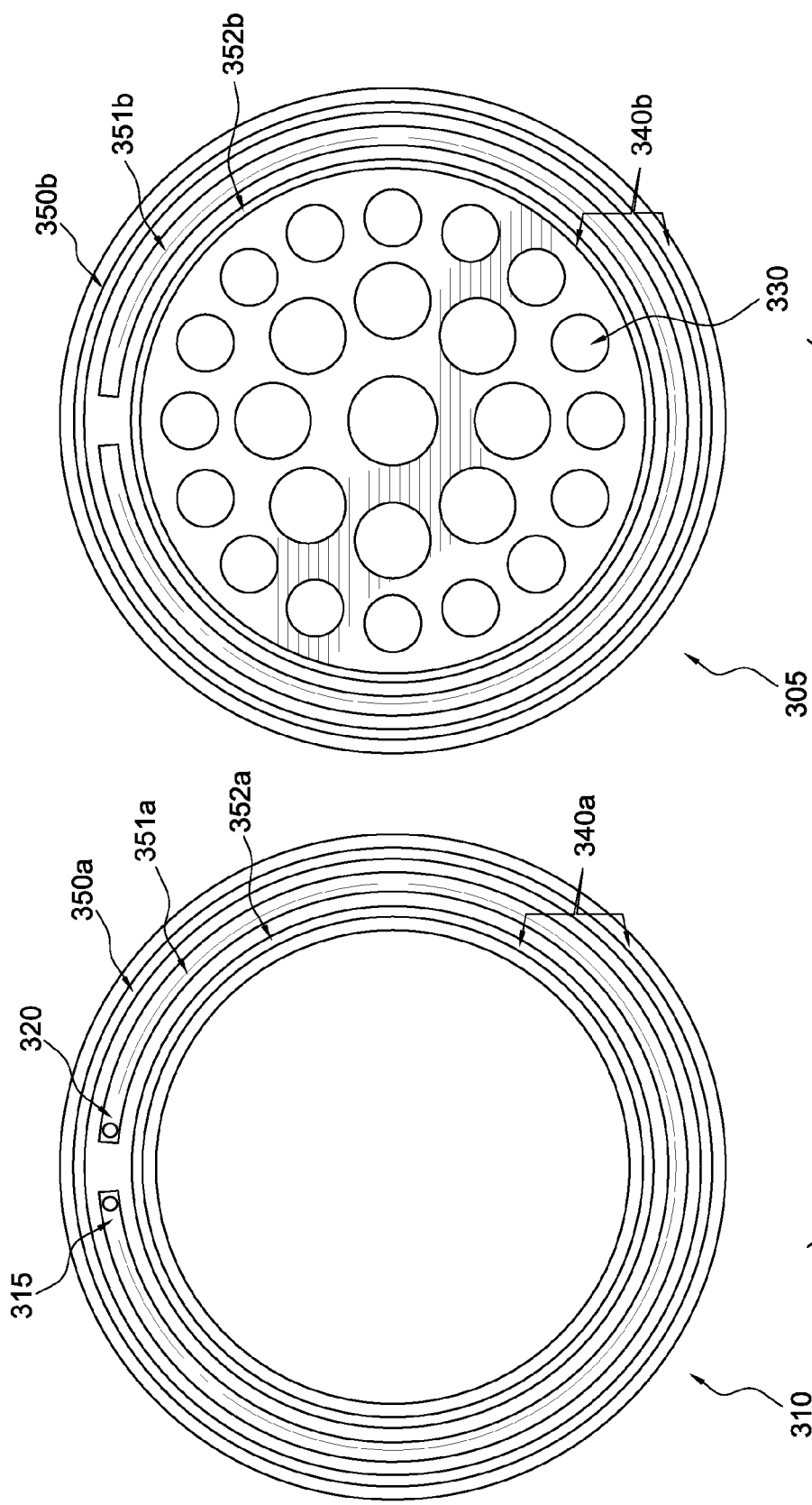
FIG. 3 illustrates a disassembled heated flow conditioning system according to one embodiment of the present invention.

FIG. 3 illustrates a disassembled heated flow conditioning system according to at least one embodiment of the present invention. As shown in FIG. 3, the system includes a flow conditioner 305 and a spacer ring 310. The flow conditioner 305 includes a plurality of apertures 330 and a flange provided around the outer perimeter of a portion or surface area comprising the plurality of apertures.

The flow conditioner includes a mating surface 340b within the flange. The spacer ring 310 includes a mating surface 340a. The respective mating surfaces 340a, 340b each include three grooves: (1) an outer groove 350a, 350b; (2) a open-ended groove 351a, 351b; and (3) an inner groove 352a, 352b.

Figure 4:
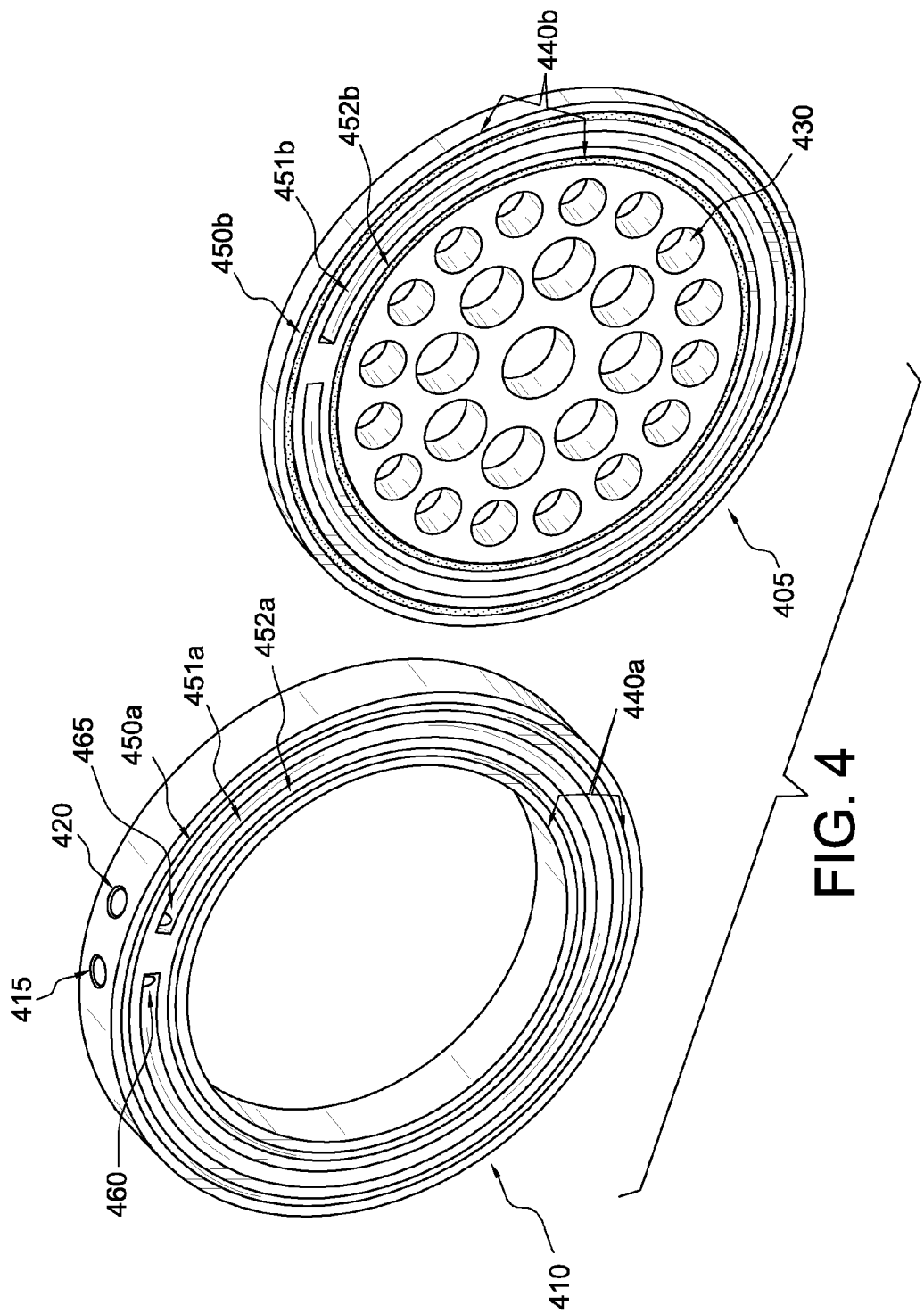
FIG. 4 illustrates a perspective view of a flow conditioning system according to one embodiment of the present invention.

As shown in FIG. 3, the open-ended groove 351a of the spacer ring 310 has openings on both ends, 315, 320, which are configured to be in flow communication with the inlet opening and an outlet opening of the spacer ring (see for example in FIGS. 2A and 4). As a result, the heating medium enters the system through the inlet opening of the spacer ring 310; flows through the open-ended grooves 351a, 351b (flowing from the input opening 315 through a fluid channel formed by connection of the open-ended grooves 351a, 351b of both mating surfaces); and exits through the outlet opening of the spacer ring 310.

FIG. 4 illustrates a disassembled heated flow conditioning system according to at least one embodiment of the present invention comprising a flow conditioner 405 and a spacer ring 410. The flow conditioner 405 includes a plurality of apertures 430 and a flange provided around the outer perimeter of a portion or surface area comprising the plurality of apertures.

The spacer ring 410 and the flow conditioner 405 each have a mating surface, 440a, 440b, respectively. The mating surfaces 440a, 440b each include three grooves: (1) an outer groove 450a, 450b; (2) an open-ended groove 451a, 451b; and (3) an inner groove 452a, 452b.

As shown in FIG. 4, the open-ended groove 451a of the spacer ring 410 has openings on both ends, 460, 465, which are configured to be in flow communication with the inlet opening 415 and an outlet opening 420, respectively, of the spacer ring 410. As a result, the heating medium enters through inlet opening 415; flows through the open-ended grooves of the system 451a, 451b forming a fluid flow channel; and exits the system through outlet opening 420.

Figure 5:
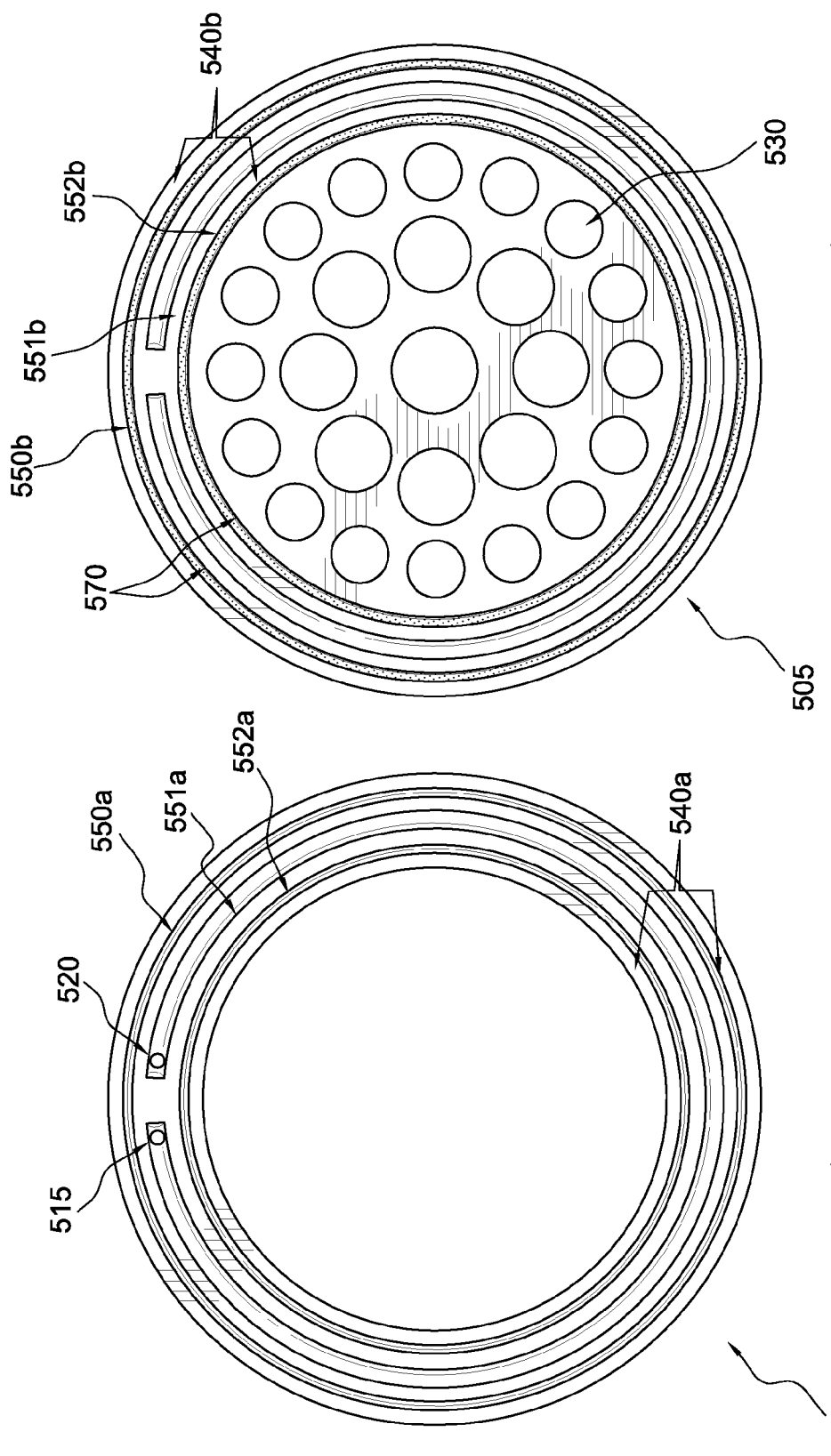
FIG. 5 illustrates a disassembled heated flow conditioning system having an O-ring according to at least one embodiment of the present invention.

FIG. 5 illustrates a disassembled heated flow conditioning system according to at least one embodiment of the present invention. The heated flow conditioning system includes a flow conditioner 505 and a spacer ring 510. The flow conditioner 505 includes a plurality of apertures 530 and a flange provided around the outer perimeter of a portion or surface area comprising the plurality of apertures.

The spacer ring 510 and the flow conditioner 505 each include a mating surface, 540a, 540b, respectively. The mating surfaces 540a, 540b each include three grooves: (1) an outer groove 550a, 550b; (2) an open-ended groove 551a, 551b; and (3) an inner groove 552a, 552b. The fluid flow is similar to that described above for FIGS. 3-4 via opening 515 and opening 520.

The system of FIG. 5 includes at least one sealing gasket, such as an O-ring 570, positioned within the inner and outer grooves of the flow conditioner 505. When the mating surfaces of flow conditioner 505 and spacer ring 510 are lined up, the O-ring 570 may therefore also be positioned or sandwiched in the inner and outer grooves of the spacer ring 510 or vice versa.

Figure 6:
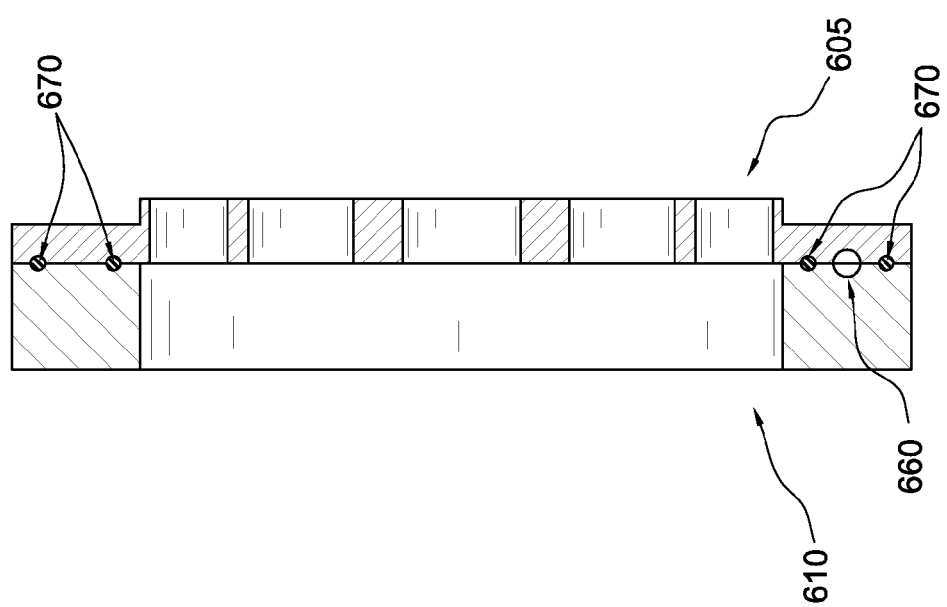
FIG. 6 illustrates a cutaway view of the assembled heated flow conditioning system of FIG. 5.

FIG. 6 illustrates a cutaway view of an assembled heated flow conditioning system according to FIG. 5 including a flow conditioner 605 and a spacer ring 610. In this view it is possible to see O-rings 670, positioned within an inner groove and an outer groove of the mating surfaces associated with the flow conditioner 605 and the spacer ring 610.

It is also possible to view of a flow channel 660 resulting from the open-ended grooves of the mating surfaces being connected.

Heated flow conditioning systems may include at least one sensor capable of detecting and reporting temperatures associated with the system. In embodiments, the at least one sensor can be attached to any portion of a flow conditioner, a spacer ring, and/or additional system components. The at least one sensor can be configured to detect and report the temperature of heating mediums and/or the temperature of the flow conditioner, the spacer ring, and/or additional system components.

At least one embodiment of the present invention may include a flow conditioner having an electroless nickel plating or coating deposited on a surface of the flange and/or on surfaces of walls of the apertures or holes. At least one embodiment may also include a spacer ring having an electroless nickel plating or coating deposited on a mating surface and/or on surfaces of walls of the inlet and/or outlet openings.

In cases where it is desired, heated flow conditioning systems of the present invention can include an electroless nickel plating deposited on a surface of the system (e.g., on all surfaces of the flow conditioner and all surfaces of the spacer ring, including mating surfaces, grooves, aperture walls, etc.). In embodiments, the plating can be uniformly applied across the surface coverage area.

The electroless nickel plating of the present invention may comprise between about 85% and about 99% nickel by weight, based on a total weight of the plating. In at least one embodiment, the electroless nickel plating may comprise between about 1% and about 15% phosphorus by weight, based on a total weight of the plating. The thickness of the electroless nickel plating may be between about 1 and about 250 microns.

The present invention is also directed to a pipe assembly. A pipe assembly may include a fluid flow pipe and a heated flow conditioning system in an orientation substantially perpendicular to an axis of fluid flow in the pipe. The heated flow conditioning system corresponds to any one of the heated flow conditioning systems described above.

The present invention is also directed to a fluid flow system comprising a fluid flow pipe; a heated flow conditioning system in an orientation substantially perpendicular to an axis of fluid flow in the pipe; and a device (e.g., meter) downstream of the heated flow conditioning system. The heated flow conditioning system corresponds to any one of the heated flow conditioning systems described above.

The present invention is also directed to methods for preventing a formation of solid buildup or deposits in a flow conditioning system.

Methods include inputting at least one heating medium into, for example, an inlet opening of the spacer ring or flow conditioner, as referred to above. The at least one heating medium may be input at a temperature that is above a minimum solid formation temperature. As referred to above, inputting the at least one heating medium into the system at a temperature above a minimum solid formation temperature can prevent certain solids (e.g., hydrates and wax) from forming. The method further includes circulating the at least one heating medium through the flow conditioning system as described.

Moreover, at least one method of the present disclosure can also include maintaining the temperature of the heating medium and/or the flow conditioner and/or the spacer ring at a temperature above the minimum solid formation temperature (e.g., the minimum hydrate or wax formation temperature) throughout operation of the heated flow conditioning system, including a period of time after the initial input of the heating medium.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment(s) was/were chosen and described in order to best explain the principles of the invention and the practical application, and to enable others of ordinary skill in the art to understand the invention for various embodiments with various modifications as are suited to the particular use contemplated.

What is claimed is:

1. A heated flow conditioning system, comprising:
   a flow conditioner comprising a plurality of apertures and a flange, said flange surrounding said plurality of holes and comprising a first open-ended groove; and
   a spacer ring comprising a second open-ended groove,
   wherein the first and the second open-ended grooves are configured to be connectable to each other, thereby forming a fluid channel for at least one heating medium.

2. The heated flow conditioning system of claim 1, wherein the first open-ended groove is in flow communication with an inlet opening and an outlet opening of the flow conditioner for the at least one heating medium.

3. The heated flow conditioning system of claim 1, wherein the second open-ended groove is in flow communication with an inlet opening and an outlet opening of the spacer ring for the at least one heating medium.

4. The heated flow conditioning system of claim 1, wherein the flange and the spacer ring each comprise a plurality of grooves.

5. The heated flow conditioning system of claim 4, wherein the flange and the spacer ring each comprise an inner groove and an outer groove, the first and second open-ended grooves being between the respective inner and outer grooves.

6. The heated flow conditioning system of claim 5, further comprising a sealing gasket positioned in the inner and outer grooves of the flange and the spacer ring.

7. The heated flow conditioning system of claim 6, wherein the sealing gasket comprises an O-ring.

8. The heated flow conditioning system of claim 1, where the flange comprises a first mating surface and the spacer ring comprises a second mating surface, said mating surfaces being removable attachable to each other.

9. The heated flow conditioning system of claim 1, where the flange comprises a first mating surface and the spacer ring comprises a second mating surface, said mating surfaces being permanently attached to each other.

10. The heated flow conditioning system of claim 1, wherein at least one surface of the flow conditioning system comprises an electroless nickel plating.

11. A method for preventing a formation of solid deposits in a flow conditioning system, comprising:
   providing a flow conditioning system according to claim 1;

inputting at least one heating medium into the fluid channel at a temperature above a minimum solid formation temperature to prevent solid buildup;
circulating the at least one heating medium through the fluid channel; and
outputting the at least one heating medium from the fluid channel.

12. A method according to claim 11, comprising:
inputting the at least one heating medium into an inlet opening of the spacer ring;
circulating the at least one heating medium through the fluid channel; and
outputting the at least one heating medium from an outlet opening of the spacer ring.

13. A method according to claim 11, comprising:
inputting the at least one heating medium into an inlet opening of the flow conditioner;
circulating the at least one heating medium through the fluid channel; and
outputting the at least one heating medium from an outlet opening of the flow conditioner.

14. The method according to claim 11, wherein the solid buildup comprises wax.

15. The method according to claim 11, wherein the solid buildup comprises hydrates of hydrocarbons.

16. The method according to claim 11, wherein the at least one heating medium is selected from the group consisting of steam, aqueous glycol, water, an oil, and combinations thereof.

17. The method according to claim 11, wherein the at least one heating medium is input at a temperature of at least 70° C.

18. The method according to claim 11, wherein the at least one heating medium is input at a temperature of about 200 to 300° C.

19. A pipe assembly, comprising:
a fluid flow pipe; and
a heated flow conditioning system according to claim 1 disposed within said fluid flow pipe in an orientation substantially perpendicular to an axis of said fluid flow pipe.

20. A fluid flow system, comprising:
a fluid flow pipe;
a heated flow conditioning system according to claim 1 disposed within said fluid flow pipe in an orientation substantially perpendicular to an axis of said fluid flow pipe; and
a device downstream of the heated flow conditioning system.

* * * * *